(12) United States Patent
Rössl (10) Patent No.: US 11,853,834 B2
(45) Date of Patent: Dec. 26, 2023

(54) ELECTRONIC SHELF LABELLING SYSTEM WITH A SHELF EDGE STRIP SUB-SYSTEM

(71) Applicant: SES-IMAGOTAG GMBH, Fernitz-Mellach (AT)

(72) Inventor: Andreas Rössl, Fernitz-Mellach (AT)

(73) Assignee: SES-IMAGOTAG GmbH, Fernitz-Mellach (AT)

( * ) Notice: Subject to any disclaimer, the term of this patent is extended or adjusted under 35 U.S.C. 154(b) by 98 days.

(21) Appl. No.: 17/617,715

(22) PCT Filed: Dec. 23, 2019

(86) PCT No.: PCT/EP2019/086993
§ 371 (c)(1),
(2) Date: Dec. 9, 2021

(87) PCT Pub. No.: WO2020/249251
PCT Pub. Date: Dec. 17, 2020

(65) Prior Publication Data
US 2022/0245368 A1     Aug. 4, 2022

(30) Foreign Application Priority Data

Jun. 14, 2019 (WO) ................ PCT/EP2019/065715
Jun. 14, 2019 (WO) ................ PCT/EP2019/065718
(Continued)

(51) Int. Cl.
*G06K 7/10* (2006.01)
*H02J 50/10* (2016.01)
*H04B 5/00* (2006.01)

(52) U.S. Cl.
CPC .......... *G06K 7/10297* (2013.01); *H02J 50/10* (2016.02); *H04B 5/0056* (2013.01)

(58) Field of Classification Search
CPC .... G06K 7/10297; H02J 50/10; H04B 5/0056
(Continued)

(56) References Cited

U.S. PATENT DOCUMENTS

8,556,172 B2 * 10/2013 Nakamura ......... G06Q 30/0603
235/385
11,508,270 B2 * 11/2022 Jauck ...................... G09F 13/02
(Continued)

*Primary Examiner* — Ahshik Kim
(74) *Attorney, Agent, or Firm* — Dennemeyer & Associates, LLC.

(57) ABSTRACT

The invention relates to an electronic shelf labelling system, wherein the system has a server which is designed to individually address a plurality of shelf labels in order to communicate data with them in an addressed manner, and wherein the system has at least one access point which is connected to the server and is designed for radio communication of the data with the shelf labels, and wherein the system has a near-field communication (NFC) sub-system on a shelf edge strip of a shelf, wherein the NFC sub-system is characterised in such a way that the shelf edge strip has an NFC reader which is designed for radio-based communication with the access point, and in such a way that at least one conductor loop is provided which is connected to the NFC reader, formed along the shelf edge strip and functioning for NFC communication with an NFC-enabled shelf label, wherein at least one NFC-enabled shelf label is attached to the shelf edge strip corresponding to the conductor loop, and wherein the NFC reader is designed for NFC communication of the data with the shelf label addressed by the server.

13 Claims, 5 Drawing Sheets

(30) Foreign Application Priority Data

Jun. 17, 2019 (WO) ................ PCT/EP2019/065894
Aug. 19, 2019 (WO) ................ PCT/EP2019/072141

(58) Field of Classification Search
USPC ........................................................ 235/451
See application file for complete search history.

(56) References Cited

U.S. PATENT DOCUMENTS

| | | | |
|---|---|---|---|
| 11,558,763 B2* | 1/2023 | Hiscock | H04W 24/08 |
| 11,580,495 B2* | 2/2023 | High | B25J 11/008 |
| 11,636,783 B2* | 4/2023 | de Haas | H01R 25/142 |
| | | | 340/5.91 |
| 2018/0366040 A1* | 12/2018 | Rössl | G09G 5/393 |
| 2023/0106402 A1* | 4/2023 | Sung | G06Q 30/06 |
| | | | 40/5 |

* cited by examiner

ELECTRONIC SHELF LABELLING SYSTEM WITH A SHELF EDGE STRIP SUB-SYSTEM

TECHNICAL FIELD

The invention relates to an electronic shelf label system having a shelf edge strip sub-system.

BACKGROUND

An electronic shelf label system for displaying information with the aid of electronic shelf label displays, referred to below as ESL system for short, wherein ESL stands for "electronic shelf label", having a proprietary shelf edge strip sub-system is known, for example, from international patent application WO 2017/153481 A1. In this known ESL system, such a shelf edge strip sub-system is installed on each shelf edge strip. In this sub-system, the shelf edge strip is equipped with electrical conductor tracks, with the aid of which the ESLs of the shelf edge strip are actuated by means of a management module of the shelf edge strip. The ESLs have on their rear side resilient contacts, with which the conductor tracks are contacted in order to connect the ESLs electrically to the management module.

However, this shelf edge strip sub-system is relatively expensive because a large number of in particular individual mechanical components must be provided in each ESL and in each shelf edge strip. These mechanical components are subject to natural wear. In addition, the mechanical components can become dirty or even damaged if not handled properly. This can lead to malfunctions during operation. The mechanical components are also associated with considerable additional outlay in both production and maintenance, which is necessary during operation to avoid the aforementioned problems. The known system also has the limitation that the ESLs cannot be positioned or displaced along the shelf edge strip in any desired manner.

The object of the invention is to provide an improved ESL system in which the aforementioned problems are overcome.

SUMMARY OF THE INVENTION

This object is achieved by an electronic shelf label system, the system comprises a server which is designed to address a multiplicity of shelf labels individually in order to communicate data with them in an addressed manner, and the system comprises at least one access point which is connected to the server and is designed for wireless communication of the data with the shelf labels, and the system comprises a near-field communication, NFC for short, sub-system on a shelf edge strip of a shelving unit, wherein the NFC sub-system is characterized such that the shelf edge strip comprises an NFC reader which is designed for wireless communication with the access point, and that at least one conductor loop is provided, which is connected to the NFC reader, is formed along the shelf edge strip and is used for NFC communication with an NFC-enabled shelf label, wherein at least one NFC-enabled shelf label is attached to the shelf edge strip corresponding to the conductor loop, and wherein the NFC reader is designed for NFC communication of the data with the shelf label addressed by the server.

The object is furthermore achieved by a method for operating an electronic shelf label system, a multiplicity of shelf labels being addressed individually in the system with the aid of a server, and data being communicated with them in an addressed manner, the data being communicated wirelessly with the shelf labels in the system via at least one access point which is connected to the server, the system comprises a near-field communication, NFC for short, sub-system on a shelf edge strip of a shelving unit, wherein the NFC sub-system is characterized such that the shelf edge strip comprises an NFC reader which is designed for wireless communication with the access point, and that at least one conductor loop is provided which is connected to the NFC reader, is formed along the shelf edge strip and is used for NFC communication with an NFC-enabled shelf label, wherein at least one NFC-enabled shelf label is attached to the shelf edge strip corresponding to the conductor loop, and wherein according to the method the data are communicated by means of NFC communication between the NFC reader and the shelf label addressed by the server.

The object is furthermore achieved by the use of a near-field communication, NFC for short, sub-system on a shelf edge strip of a shelving unit of an electronic shelf label system, wherein the shelf edge strip comprises an NFC reader and at least one conductor loop which is connected to the NFC reader, is formed along the shelf edge strip and is used for NFC communication with an NFC-enabled shelf label, and at least one NFC-enabled shelf label is attached to the shelf edge strip corresponding to the conductor loop and is designed for NFC communication with the NFC reader, wherein the NFC sub-system is used to communicate data with a shelf label addressed by a server of the system in an NFC communication.

The measures according to the invention are associated with the advantage that the shelf label to be attached to the shelf edge strip is completely free of electromechanical contacts and the problems associated therewith. In fact, in contrast to the known sub-system mentioned in the introduction, in which each shelf label must have a specific, proprietary electromechanical design, only a standardized NFC communication module must be provided in the shelf label in order to communicate contactlessly according to a (common) NFC specification or an NFC standard with the NFC reader forming a shelf edge strip management module (also referred to as shelf edge strip controller).

In particular, with the usually high number of installed shelf labels (sometimes up to several tens of thousands of units in larger supermarkets), the integration of this standardized NFC module has a considerable positive effect on the cost structure of the overall system. On the one hand, the shelf label can be produced much more cost-effectively and also operated without maintenance because electromechanical components, in particular those requiring maintenance, are avoided. There are of course additional costs for the specific shelf edge strip with its conductor loop, but these are not comparable with the production and operating costs which must be taken into account for the known shelf labels and the known shelf edge strips with their large number of electromechanical contact elements.

In the present case, in contrast to the known sub-system, only one single modified NFC reader per shelf edge strip must be provided, the modification of which consists substantially in that it has a formation (structurally speaking an additional communication module) for communication with the access point and contacts the conductor loop. However, in contrast to the known sub-system, this electromechanical contact only has to be made at the position of the NFC reader, which is preferably integrated in the shelf edge strip (e.g. can be fastened thereon or installed or inserted therein) on the left or right end of same. This in turn means that the shelf labels can be positioned as desired along the shelf edge strip and also displaced or freely (continuously) shifted within the limitation of the position or extent of the conductor loop. It is thus possible to position the electronic shelf labels according to the actual positioning of the products, analogously to the way that paper-based shelf labels can be positioned.

If the shelf edge strips are over-long, they can also be segmented and have a number of NFC readers corresponding to the number of segments, with associated conductor loop(s) per segment (that is to say, at the location of the segments or inside the segments).

The NFC sub-system in the electronic shelf label system assumes the role of an intermediary device in order to be able to address the shelf labels addressed by the server physically, that is to say, to communicate with them. In the NFC system, communication therefore takes place in compliance with the NFC standard, the shelf labels being addressed by means of the server, and the NFC sub-system converting or applying this addressing, which is discussed below in different exemplary embodiments.

The data produced during communication can be status data, which for example are retrieved individually from the addressed shelf labels. However, this can also be command data representing commands which can be decoded and processed by the shelf labels and sent from the server to the addressed shelf label. These commands can, for example, effect the querying of the status data or else control other functions or functionalities of the shelf labels. However, the data can also be image content data, which is transferred to a shelf label with display medium, in order to display image content there.

The server can be a physical computer which is accommodated on the premises of a business and is responsible for the control and management of the shelf labels and their activities there and on which corresponding control software is executed. However, the server can also be understood as a cloud solution, with which the control software is executed in a computing centre spatially separate from the business. The control software creates, inter alia, a logical link between individual shelf labels and products or product groups and stores the same. In addition, it manages what is known as a planogram, which represents the spatial distribution of the shelf labels in the business premises. Furthermore, this control software can also perform logistics tasks.

Further particularly advantageous embodiments and developments of the invention result from the dependent claims and also the following description. In this case, features of one claim category can be developed in accordance with the features of the other claim category, so that the effects and advantages listed in connection with the one claim category are also present for the other claim categories.

In the system in question, different identifiers (identification data) are used, which are used for the unique identification of the devices integrated in the system, specifically as follows:

An access point identifier uniquely identifies the respective access point. The access point identifiers of the access points existing in the system are known to the server, that is to say, stored there, because all communication with individual shelf labels flows via the respective access point to which the relevant shelf label is wirelessly assigned, that is to say registered.

A shelf label identifier uniquely identifies the respective shelf label for the server. In order to be able to handle addressed data traffic with the shelf labels, the server therefore also manages the shelf label identifier, unique to it, of each shelf label in use in the business. In particular, the server stores the assignment between the respective access point and the shelf labels assigned to this access point.

A shelf label NFC identifier uniquely identifies each shelf label in the context of NFC communication and is used again during such NFC communication with an NFC reader.

A reader NFC identifier is the counterpart on the side of the NFC reader and uniquely identifies an NFC reader for NFC communication with one of the NFC-enabled shelf labels.

A reader identifier uniquely identifies each NFC reader and is needed for example during registration of the relevant NFC reader at one of the access points in order to communicate wirelessly with this access point subsequently.

It should already be mentioned at this point that, according to a first embodiment, it is sufficient for the server merely to know the shelf label identifier in order to address the relevant shelf label, whereas, according to a second embodiment, it is additionally necessary to know a reader identifier linked to the relevant shelf label identifier in order to address the shelf label indirectly via the reader. This is discussed further in detail below.

The electronic shelf label can provide or fulfil a wide variety of functionalities or functions. For example, the shelf label can be configured or accordingly designed e.g. to detect environmental parameters such as e.g. for temperature or moisture detection, or as an input element for receiving an input interaction of a user (e.g. detecting a fingerprint or a key press) or else as a display medium for presenting information for the user, namely as a shelf label display. In any case, the shelf label is designed such that it can be attached mechanically to the shelf edge strip in question and is supplied there with energy and data during NFC communication in the manner described in detail in the following.

The NFC-enabled shelf label has a standardized, first NFC interface. This is associated with two advantages. This NFC interface is used on the one hand for local energy transmission on the shelving unit or on the shelf edge strip, specifically for a single shelf label or equally a group of shelf labels attached to this shelf edge strip, and on the other hand for bidirectional local contactless communication of data directly there. The shelf labels can also be supplied with energy contactlessly without additional wiring or additional power supply units. At the same time, problems in wireless traffic caused by other radio systems in a business are also avoided because they are usually located far away from the shelving units where the shelf label is installed and therefore have hardly any or no influence at all on the local energy transmission or communication between the communication partners (NFC-enabled shelf label and NFC reader with its conductor loop(s)) positioned very close to each other directly on the shelf edge strip.

As mentioned, NFC stands for Near Field Communication, and the applicable standards are e.g. ISO/IEC 13157, -16353, -22536, -28361 etc.

The shelf label, when configured as a shelf label display, can comprise an energy-saving display unit such as e.g. an LCD display. In particular, the technology used is based on electronic ink or electronic paper technology. A display unit of this type therefore has a reflective screen, also termed electronic paper display, abbreviated EPD, in technical jargon, and is realized with the aid of "electronic paper", abbreviated to "e-paper" or "e-ink". These terms substantially stand for the principle of an electrophoretic display which contains e.g. positively charged white particles and negatively charged black particles in a transparent, viscous polymer. By briefly applying a voltage at electrodes, between which the medium made up of particles and polymer is arranged, either the black particles are placed in front of the white particles or vice versa in the viewing direction. This arrangement is then maintained for a relatively long time (e.g. a few weeks) without further energy supply. If the display is segmented accordingly, e.g. letters, numbers or images can be realized with relatively high resolution in order to display said information. Such a reflective screen can however also be realized with the aid of other technologies, which are known e.g. under the term "electrowetting" or "MEMS". The screen can be designed e.g. as mentioned for black and white display, for greyscale display, for black, white and red display or else for black, white and yellow display. Future developments, which enable a full-colour or even multi-colour display, should also be included. Such a screen is very generally a reflective, that is to say passive, non-self-illuminating display, in which the—relatively static—information display is based on light generated by an external (artificial or natural) light source shining onto the screen and being reflected from there to the observer.

Exactly like the other electronic components of the shelf label, upon receipt of an NFC wireless signal, which is generated by the NFC reader, by the first NFC interface, this display unit is supplied with energy on the one hand and data on the other hand, which can represent commands for controlling the display unit or else image contents. During energy supply via the NFC interface, the said data can also be transmitted via this first NFC interface, said data being processed by the display unit to the effect that the image content of its screen changes. After the image content has finished changing, corresponding status information representing the successful change of the image content can also be output by the display unit via the NFC interface. After the image content has finished changing, where applicable also after the status information has been output, the energy supply via the NFC interface can be terminated, e.g. by setting the generation of the NFC wireless signal, after which the image content of the screen remains unchanged until the next desired change.

The use of said technologies in particular allows the shelf label to be realized in particular as a shelf label display without its own energy supply such as a battery or a rechargeable battery for example, which are both relatively expensive. For the purposes of maintenance or replacement of the battery or rechargeable battery, a conventional shelf label must also be designed such that said energy storage devices are replaceable. Where necessary, only a capacitor for short-term, temporary smoothing or stabilization of the internal supply voltage is still used in the shelf label. The shelf label is therefore designed such that its electronics for communication or for updating the screen content or for receiving user interaction or for detecting environmental parameters, in particular its electronic controller, is only active when it is supplied with the aid of the NFC reader of the shelf edge strip.

However, the shelf label can also have—in addition to one or more smoothing capacitors and/or backup capacitors which may be provided—a long-term energy storage device for its at least temporary autonomous energy supply. This long-term energy storage device can be realized, for example, by a replaceable or else chargeable battery. Preferably, however, the long-term energy storage device is realized by a "supercapacitor", "supercap" for short, also referred to as an "ultracapacitor". The advantage of such a capacitor is that it is a high-power capacitor with a capacitance which is much higher than conventional capacitors, but the capacitor has lower voltage limits and bridges the gap between electrolyte capacitors and chargeable batteries. It typically stores 10-100 times more energy per unit volume or mass than electrolyte capacitors, can receive and output charge much faster than batteries, and tolerates many more charging and discharging cycles than rechargeable batteries. The long-term energy storage device for the shelf label is supplied or charged by the NFC wireless signal output via the conductor loop, as long as the NFC wireless signal is present. Charging can take place directly with the aid of a voltage generation stage, which generates a supply voltage from the received NFC wireless signal, or with the aid of the shelf label's own charging electronics. After the NFC wireless signal has gone, the electronics of the shelf label can be supplied with the aid of the long-term energy storage device at least for a much longer time than would be the case with a backup capacitor or a smoothing capacitor. This allows commands or even data itself to be processed in the absence of the NFC signal and other functionalities to be provided, such as the processing of a user input or else the detection of a temperature in a time period in which the NFC wireless signal is not present.

The housing of the shelf label can be completely and permanently encapsulated, because it is no longer necessary to replace the energy storage device, and therefore it can only be opened for recycling purposes (e.g. with a special tool).

A shelf label which is reduced to a few, absolutely necessary electronic components and is therefore also extremely inexpensive can thus be realized. This extremely reduced shelf label only needs still to have a basic functionality, such as e.g. standardized NFC communication with standardized energy supply during the NFC communication, which is realized with the aid of a commercially available NFC module.

Updates to the screen of the energy-saving display unit and status report relating thereto or else the transmission of data relating to a user interaction or else an environmental parameter are not made directly by the shelf label display in communication with an access point, as is the case in known systems, but by the interposed NFC reader, which for its part is in wireless contact with the access point, which is discussed in detail in the following.

As mentioned, a conductor loop is formed on the shelf edge strip, and the loop connectors of this conductor loop are connected to the NFC reader of the shelf edge strip. The conductor loop therefore forms a constituent of the NFC reader for contactless NFC communication with the NFC-enabled shelf label, which is mounted on the shelf edge strip corresponding to the conductor loop. In this case, "contactless" means that it can take place with the aid of an inductive coupling between two adjacently located conductor loops or coils. To this end, the shelf label also has a conductor loop consisting of a single loop or a plurality of windings, that is to say, a coil. Signal transmission from the NFC reader to the NFC-enabled shelf label can however also take place by sending the NFC wireless signal and receiving with an antenna of the shelf label. To this end, the NFC reader has a transmitter with an antenna configuration which is provided substantially by the conductor loop. To a person skilled in the art, it is a matter of routine that an antenna matching network and a transmission stage, a modulator and a demodulator etc. are present. These components and their interconnection on analogue antenna components can be found in the relevant "application notes" of NFC reader IC manufacturers.

To receive the NFC signal, the shelf label also has a conductor loop consisting of a single loop or winding or a multiplicity of windings, that is to say a coil. This coil is a constituent of the first NFC interface of the shelf label. In this case too, the specific implementation can be found in the relevant "application notes" of the manufacturer of NFC-ICs.

Furthermore, "corresponding to" means that the shelf label is positioned adjacently to the area spanned by the conductor loop and is located there substantially inside a zone delimited by the conductor loop. The conductor loop itself may be designed to be e.g. visible in the plane of the shelf edge strip or covered by a protective material (strip). If the shelf label is inserted into the shelf edge strip (that is to say, mechanically fastened there), the conductor loop or coil installed in the shelf label is automatically located in the zone usable for the inductive coupling between the two conductor loops or coils positioned next to each other. Preferably, in the shelf label inserted into the shelf edge strip, the areas spanned by the two conductor loops or coils (on one side belonging to the shelf edge strip and on the other side belonging to the shelf label) are oriented parallel to each other and at a spacing of less than one millimetre to a few millimetres. To avoid impeding transmission of the NFC wireless signal, the shelf edge strip itself is manufactured from a suitable material, preferably plastic. It can also have a shielding plate on its rear side to obtain a defined attenuation of the antenna resonant circuit of the NFC reader, which allows the antenna resonant circuit to be tuned to this defined environment and thus makes a considerable contribution to communication reliability, since metallic loads in the environment of the NFC reader can thus be largely disregarded.

The perimeter of the conductor loop of the shelf edge strip can extend, for example, along the entire length of the shelf edge strip and at least along part of the entire height of the shelf edge strip. To realize the conductor loop, a single conductor track running round or a conductor track running around multiple times in a coil-like manner, that is, having multiple windings, can be provided. Multiple conductor loops or coils, which are connected to the NFC reader, can also be installed along the shelf edge strip. In this connection, it can be advantageous that the NFC reader is designed to multiplex the conductor loops. In this case, only one single conductor loop, which electronically selected, is ever used to transmit the NFC wireless signal. It has proven particularly advantageous when exactly one single NFC reader is used per shelf edge strip, because this allows the use of an NFC reader without a conductor loop multiplexer. This allows a conventional NFC IC (integrated circuit) to be used for energy supply for an entire shelf edge strip.

The energy supply of the NFC reader of the shelf edge strip can be realized in different ways. For instance, the NFC reader can be supplied using a separate power supply unit. A group of the NFC readers can also be supplied using a central power supply unit. Particularly preferably, however, the NFC reader is designed to be supplied with energy in a wireless manner. This requires a supply station, which for its part is designed as a wireless energy source for the in particular directional wireless energy supply of the NFC reader. With the aid of the supply station, therefore, a contactless, targeted energy transmission to the NFC reader takes place. This allows a substantially cable-free supply infrastructure for the shelf labels fastened to the shelf edge strip on the one hand and for the NFC readers provided for supplying the shelf labels on the other hand. In fact, the fitter of the system is spared the cabling between the actual energy source and the respective shelving unit. These circumstances allow the shelving units to be positioned substantially as desired within the business and the shelf edge strips to be positioned as desired and simply on a wide variety of shelving units and also to be exchanged between the shelving units. This type of energy transmission and the technology on which it is based is referred to using the term "power over WiFi". Wireless energy sources equipped with this technology can be installed for example on the ceiling of business premises and selectively supply, within a range of up to a maximum of 10 metres, the NFC readers assigned to the respective shelf edge strips and located within said range with the aid of powerful, that is to say, focused wireless signals directed towards said NFC readers.

In addition to the NFC interface which is provided for communication with the NFC-enabled shelf labels, the NFC reader has a further interface, specifically the already mentioned additional communication module, which is intended for communication with the access point. This further interface is designed for wireless communication and accordingly has a wireless transceiver for communication in the 2.4 GHz band, for example. The transceiver is an electronic system which is designed both to receive and transmit wireless signals and in which the required functionality for modulating a carrier signal and demodulating receive signals is provided. The transceiver can be realized by means of active and passive electronic components or modules, such as a matching network for an antenna and antenna configuration etc., with the aid of which analogue signals can be converted into digital signals and vice versa. The transceiver can be coupled to a logic stage. The logic stage can be realized for example by means of discrete hardware or have a microprocessor and memory modules or a microcontroller with integrated memory modules so that software stored in the memory modules can be executed. The NFC reader can receive a wireless signal from the access point with the aid of its transceiver, process receive data contained in the wireless signal with the aid of the logic stage, and where necessary generate response data with the aid of the logic stage and output said response data again via the transceiver to the access point as a wireless signal. The NFC reader thus realizes in communication terms a "gateway" for all the shelf labels mounted on the relevant shelf edge strip.

The access point is equipped analogously to this in order to communicate wirelessly with the NFC reader. Wireless traffic can take place according to WLAN, ZigBee or else Bluetooth communication protocols.

Particularly preferably, the access point and the NFC reader are designed for wireless communication according to a (proprietary) time slot communication method; wherein in the time slot communication method, a number of time slots in a repeating sequence per time slot cycle are available for communication, wherein each time slot is preferably identified by a unique time slot symbol.

A proprietary time slot communication method is preferably used for this, such as that known in principle from WO2015/124197, pages 2 to 4 and FIGS. 1-8C and the associated description, the specific disclosure of which is hereby incorporated by reference, wherein in the present case it is not the shelf labels but the NFC reader which is designed for communication with the access point according to this time slot communication method, specifically as follows.

According to this proprietary time slot communication method, the access point communicates with a number of NFC readers such that a number of time slots in a constantly (continuously) repeating sequence per time slot cycle are available for communication, and each time slot is identified uniquely by a unique time slot symbol and thus can be distinguished from other time slots solely by the time slot symbol. According to the method, the access point sends, for the currently present time slot, a synchronization data signal having the time slot symbol at the start of the respective time slot. The NFC readers know this time slot communication method system and are designed to change, at a wake-up time, from an (extremely energy-saving) sleep state, in which they are not ready to receive wireless signals, into an active state, in which they are ready to receive wireless signals, and to receive the synchronization data signal in the active state, and, when the received time slot symbol indicates a time slot defined for the respective NFC reader, to define a new wake-up time, which corresponds to the next occurrence of the time slot defined for this NFC reader, in a time slot cycle following the currently present time slot cycle.

This has the advantage that a synchronism between the access point and one of the NFC readers can be detected, maintained and ensured during operation of the system in the most simple and yet extremely robust manner. This also improves the energy efficiency of all the NFC readers which are logically assigned to a single access point, because the check for synchronism takes place immediately at the start of the time slot. The further behaviour of the NFC reader depends on whether one of the shelf labels installed on its shelf edge strip or the NFC reader itself is addressed within the time slot defined for it.

In principle, the synchronization data signal could be formed exclusively by the time slot symbol, and further communication parameters required for communication with the access point (or server), such as e.g. address data for addressing or command data for transmitting commands, could be separate from the synchronization data signal. However, since the time slot symbol is an extremely compact indicator for synchronizing communication in the system, that is to say, can be formed e.g. by the serial number of the time slot, it is clear that further information can be embedded in the synchronization data signal in addition to the time slot symbol, which is discussed below.

It is therefore advantageous if the access point is designed to embed in the synchronization data signal address data, with the aid of which a number of NFC readers and/or shelf labels per time slot can be addressed individually.

Analogously to the previous statements relating to embedding address data, there is a further considerable contribution to system efficiency when the access point is designed to embed in the synchronization data signal command data which causes the addressed device (NFC reader and/or shelf labels) to execute a command. However, a command can also, for example, be transmitted to all the devices assigned to a certain time slot without individual addressing and can then be executed by a relatively large group of devices, for example all of them.

In principle, the shelf label could execute a standardized (predefined) task merely by detecting its individual addressing, without an explicit command having to be received. However, it has proven particularly advantageous when address data are transmitted to address an individual shelf label and command data are transmitted to transmit a command to the said individual shelf label, and the shelf label is designed to evaluate the command data and execute the command when it is addressed individually with the aid of the address data. A command for a single shelf label can thus be transmitted in a sometimes relatively large group of shelf labels.

It is therefore initially completely sufficient for each NFC reader involved in communication with the relevant access point, that is to say, is assigned to it wirelessly e.g. by initial registration, to know the time slot symbol which indicates the time slot defined for it. Each of the NFC readers therefore orients itself individually by the occurrence of a time slot symbol relevant for it, identifies the time slot symbol relevant for it, and defines its next wake-up time in order to remain synchronous with the timing of the time slot communication method predefined by the communication station, this timing being known to the NFC reader, as mentioned. In this case it is completely sufficient for the time slot symbol to identify the respective time slot uniquely, e.g. with a time slot identifier that is individual for each time slot. Further information encoded in the synchronization data signal, as often occurs in other methods, is not necessary here to operate the NFC readers synchronously with the access point to which they are wirelessly assigned. The relevant NFC reader therefore establishes its synchronism with the access point solely by the fact of detecting the time slot symbol, which occurs at the time expected by it or within an expected time window and indicates the time slot intended for it.

After the NFC reader has established its synchronism as explained above, it is in principle sufficient for it to change back into the sleep state, because the next wake-up time is automatically known by means of the time slot pattern, known to it, of the time slot communication method. The definition of the new wake-up time can thus be limited to, e.g. a time control stage (e.g. a timer) of the NFC reader being restarted with the timing parameters already used previously to change from the sleep state to the active state. The affected NFC reader can then change back into the sleep state and stay there until, triggered by the time controller, a wake-up and a change from the sleep state to the active state is carried out again at the new wake-up time in the next time slot cycle. However, the NFC reader does not necessarily have to stay in the sleep state for the rest of the time slot intended for it, but can also process further tasks, such as e.g. NFC communication with one of the shelf labels, in its active state during the time slot or also during the time slot cycle. The previously explained time controller then operates in the background independently of the other, further activities of the NFC reader. The new wake-up time can be defined by defining an absolute or relative time specification, for example relatively to the time of occurrence of the synchronization data signal or relatively to the time at which the sleep state is assumed again after the active state, or else relatively to the time at which the end of the synchronization data signal occurs. However, the definition of the new wake-up time can also be understood such that the duration of the sleep state following the active state in which the time slot symbol was received or else the sum of the durations of the sleep state and of the active state or else the sum of the durations of multiple such state sequences defines the new wake-up time.

Since each NFC reader operates its own time control stage and exemplary scattering of the behaviour of the respective electronic components cannot be ruled out, the definition of the new wake-up time can also include compensation for a drift of the time basis present individually for each NFC reader. To this end, for example, a time difference between the expected occurrence of the synchronization data signal with the time slot symbol which indicates the time slot defined for the respective NFC reader and the actual occurrence can be measured in the NFC reader and taken into account in the time control stage to correct its timing. However, the compensation is only used when synchronism is established.

If, however, a different time slot symbol instead of the expected time slot symbol was received, there is no synchronism and the NFC reader must carry out a re-synchronization. To this end, such an asynchronous NFC reader changes from its sleep state into its active state and remains in the ready-to-receive state in this active state e.g. a single time at any desired time rather than periodically, as would be the case in the synchronous state. If nothing was received within a certain time period, for example a time slot duration, it changes back into the sleep state and repeats the receive attempt at another time. As soon as a synchronization data signal is received, the time slot symbol is evaluated, that is to say, checked. The time slot symbol received indicates with the highest probability a time slot which is not defined for the NFC reader in question, which is established autonomously by the NFC reader. The NFC reader knows the system of the occurrence of the time slot symbols and can automatically decide, after evaluating the received time slot symbol, whether it can expect the time slot defined for it in the present time slot cycle (first case) or not until the following time slot cycle (second case). For the first case, the NFC reader is designed to define a new wake-up time corresponding to the next occurrence of the time slot defined for it, in the currently present time slot cycle. By evaluating the received time slot symbol and knowing the system of the occurrence of the time slot symbols, the NFC reader establishes that the time slot defined for it will occur in the currently present time slot cycle. For the second case, the NFC reader is designed to define a new wake-up time corresponding to the next occurrence of the time slot defined for it, in the time slot cycle following the currently present time slot cycle. By evaluating the received time slot symbol and knowing the system of the occurrence of the time slot symbols, the NFC reader establishes that the time slot defined for it will no longer occur in the currently present time slot cycle because it has already occurred in the past within this time slot cycle. As explained above with regard to the synchronous state, the said time controller is also used for this type of definition of the new wake-up time, wherein the time controller is operated with the timing parameter with which the desired entry into the synchronous state is achieved. The timing parameter to be selected results for the supply device from the inherent knowledge of the time slot communication method used. The timing parameter is therefore defined by the electronics of the NFC reader, which has knowledge of the parameters of the time slot communication method.

These parameters can be requested from the access point by the NFC reader or transmitted to it when the NFC reader is registered at the respective access point, or can already be programmed into the NFC reader beforehand. In both cases, it is expedient if the NFC reader has a storage stage for storing the parameters of the time slot communication method, and the NFC reader is designed to access and take into account these parameters for the purpose of defining the new wake-up time. The parameters can represent all the details of the timing of the time slot communication method, such as parameters relating to time sequences for communicating between the access point and the NFC reader, parameters relating to predefined times or time segments, but also parameters relating to the basic structure of the time slot communication method such as e.g. the number of time slots, the duration of a time slot, the duration of the time slot cycle, or else as parameters, the explicitly specified time slot symbols for identifying the individual time slots or else algorithms for calculating the time slot symbols. With the aid of these parameters, an asynchronous NFC reader can clarify autonomously, that is to say, automatically for itself without external assistance, whether, on the basis of the time slot symbol just received, the time slot defined for it can still be expected within the currently present time slot cycle or whether the time slot defined for it already belongs to the past in the present time slot cycle and therefore the next time slot defined for it will not occur until the next time slot cycle. The NFC reader in question calculates the new wake-up time in the active state, changes to the sleep state, and changes to the active state at the calculated wake-up time, receives the time slot symbol of the time slot defined for it and is then back in the synchronous state. If no further activities are expected of it in the present time slot, it changes immediately to the sleep state and then does not change back to the active state until the next time slot cycle, in order to receive the synchronization data signal in the time slot defined for it.

The fact that the relevant NFC reader now knows about the time slot symbol which indicates the time slot defined for it, that is to say, knows exactly when it must be in the active state to be available for communication, arises in different ways and ultimately depends on which of the two embodiments explained below is used.

According to a first embodiment, the NFC reader stores a data structure representing an assignment of a shelf label fastened to its shelf edge strip to one of the time slots, the NFC reader being designed to check the time slot to which a shelf label is assigned according to the data structure as to whether the shelf label fastened to its shelf edge strip is addressed by the server.

In the present case, the data structure is composed of the shelf label identifier, which is also known to the server and used by it for addressing, and the associated time slot symbol. They form a data pair of the data structure for each shelf label fastened to the shelf edge strip of the NFC reader. If multiple shelf labels fastened to this shelf edge strip are assigned to a certain time slot, which is quite possible technically, their shelf label identifiers can also be assigned to the respective time slot symbol in a grouped manner, or else separate data pairs consisting of the respective shelf label identifier and the relevant time slot symbol can be stored in the data structure. The data structure also has a shelf label NFC identifier for each shelf label identifier defined for addressing by the server, said shelf label NFC identifier being used in NFC communication between the NFC reader and the shelf label to address the NFC-enabled shelf label on the NFC communication level.

Furthermore, the NFC reader is designed to transfer data between the addressed shelf label and the access point when there is a positive check result. Depending on the design variant, these data can then be transferred initially to the NFC reader in the time slot defined for the addressed shelf label according to the data structure or else distributed over multiple additional time slots. Depending on whether the data are time-critical data, these data can then be communicated with the relevant shelf label in real time, that is to say, in the respective time slot, within the NFC sub-system. If the data are not time-critical, it can be initially received in the relevant time slot and buffer-stored in the NFC reader during a planned transfer to the shelf label and then transferred to the shelf label in NFC communication separately from the timing of the time slot communication method. The same applies for data which are retrieved by the shelf label. These data can also be initially collected and buffer-stored within the NFC sub-system, that is to say, by the NFC reader, separately from the time slot communication method and then output to the access point via the NFC reader in the provided time slot.

The data can be command data or else content data. Content data are often coupled to command data. A display control command with image data forming content data can thus be transferred to a shelf label with a display unit. Temperature data etc. can also be retrieved with the aid of a query command from an addressed shelf label which has a temperature sensor.

The design of the NFC reader in the present case is characterized in that the NFC reader, as mentioned, comprises its energy-saving sleep state, in which it is not ready to communicate with the access point, and its active state, in which it is ready to communicate with the access point, and in that the NFC reader is designed to change from the sleep state to the active state promptly upon the occurrence of the time slot to which a shelf label is assigned according to the data structure. This means that the NFC reader can also be in its active state multiple times within a time slot cycle for the purposes of checking synchronism and addressing. Specifically, the number of these active states depends on how many time slots are assigned to it on shelf labels assigned to the shelf edge strip.

The data structure therefore allows the synchronous NFC reader to be in the active state at the time of occurrence of the respective time slot symbol and to check whether one or more of its shelf labels which is/are recorded in its data structure is/are addressed by the server with the aid of the address data.

In the present case, it is implemented on the server side that the server stores an individual shelf label identifier of each shelf label in a database and addresses the respective shelf labels directly using the shelf label identifier. As mentioned above, the access point identifier is also used for this, to address the access point via which the relevant shelf label can be wirelessly addressed.

A significant advantage of this embodiment consists in that it is backwards-compatible with that in the aforementioned WO2015/124197. Accordingly, the software application running on the server does not have to have any knowledge of the NFC sub-system. However, this embodiment has a significantly better system energy balance than the system disclosed in WO2015/124197 even from an installation of two or more shelf labels per shelf edge strip, the two or more shelf labels being assigned to a single time slot. In the system of WO2015/124197, each shelf label must namely be in the active state at least once per time slot cycle in order to verify its synchronous state and consequently to check whether it is addressed. By contrast, in the present embodiment, only the NFC controller to which the said two of the plurality of shelf labels are assigned has to be in the active state in the relevant time slot in order to verify the synchronism and check whether one or more of the shelf labels are addressed.

In contrast to the previously explained embodiment, according to a second embodiment, the NFC reader itself is assigned to one of the time slots and stores a data structure which represent the shelf labels fastened to the shelf edge strip of the NFC reader, and the NFC reader is designed to check the time slot to which it is itself assigned as to whether the shelf label fastened to its shelf edge strip is addressed by the server.

In the present case, however, the addressing carried out by the server relates to the primary, that is to say, direct addressing of the NFC reader, via which one of its shelf labels is then addressed indirectly. The indirect addressing of the shelf label is transmitted to the addressed NFC reader e.g. in the form of the command data, which was mentioned in connection with the explanation of the time slot communication method and which represents an indirect addressing command which contains, as argument, the shelf label identifier of the shelf label to be indirectly addressed, in the time slot to which the NFC reader is assigned.

In the present case, the data structure is composed of the shelf label identifier of the shelf labels which are fastened to the shelf edge strip of the relevant NFC reader. The data structure also has a shelf label NFC identifier for each shelf label identifier defined for addressing by the server, said shelf label NFC identifier being used in NFC communication between the NFC reader and the shelf label to address the NFC-enabled shelf label on the NFC communication level. Furthermore, the data structure can also have the time slot symbol which identifies or indicates the time slot which is defined for the NFC reader.

Furthermore, the NFC reader is designed, when there is a positive check result, to transfer data between the addressed shelf label and the access point in the time slot defined for it.

With regards to the processing of the data in the NFC sub-system, the considerations and mechanisms presented in connection with the above-explained embodiment can be used analogously.

The design of the NFC reader in the present case is such that the NFC reader, as mentioned, comprises an energy-saving sleep state, in which it is not ready to communicate with the access point, and an active state, in which it is ready to communicate with the access point, and that the NFC reader is designed to change from the sleep state to the active state promptly upon the occurrence of the time slot to which it is itself assigned. This means that a synchronous NFC reader is in the active state only a single time within a single time slot cycle, in order to check its synchronism and check whether it is addressed in the time slot defined for it.

It should be mentioned here that multiple NFC readers can also be assigned to a single time slot.

In the present case, it is implemented on the server side that the server stores, in a database, a link between a reader identifier of an NFC reader and a shelf label identifier of the shelf label which is installed on the shelf edge strip of the NFC reader, and addresses a shelf label indirectly via the link between the shelf label identifier of the shelf label to be addressed and the reader identifier.

In contrast to the first embodiment, the second embodiment is no longer backwards-compatible with that of the aforementioned WO2015/124197, because the system according to WO2015/124197 does not have any possibility at all of storing and managing the reader identifier and using it for addressing the shelf labels. In contrast to this, however, the second embodiment is much more energy-efficient in comparison with the solution of WO2015/124197, but also in contrast to the solution according to the first embodiment, specifically even as soon as two or more shelf labels per shelf edge strip are installed. In the system of WO2015/124197, each shelf label must namely be in the active state at least once per time slot cycle in order to verify its synchronous state and then check whether it is addressed. The same applies to the first embodiment, wherein here the NFC reader must be in the active state twice per time slot cycle when two shelf labels assigned to different time slots are installed on its shelf edge strip. In contrast to this, it is sufficient in the present embodiment if the NFC reader is in the active state only once per time slot cycle in order to verify its synchronous state and then check whether it is addressed. In particular, this is independent of how many shelf labels are installed on its shelf edge strip.

According to a preferred design of the shelf label, the shelf label comprises an energy-saving display unit, in particular based on electronic ink or electronic paper technology etc., which makes a considerable contribution to the energy efficiency of the system. Such a display unit manages without energy consumption, apart from changes to the image content.

Particularly preferably, the shelf label comprises a chargeable, electrical energy storage device, preferably the aforementioned long-term energy storage device, and is designed to charge the energy storage device contactlessly with the aid of an NFC wireless signal of the NFC reader. This realization fully exploits the potential of the NFC sub-system, because not only are addressing and data traffic handled via the NFC sub-system, but also the NFC sub-system ensures autonomous operation of the shelf labels even for time periods in which there is no NFC wireless signal, specifically without any outlay on cabling and/or maintenance, which would otherwise be necessary for replacing batteries and the disposal of spent batteries or the recharging of chargeable batteries.

It can be stated generally that in the present system, every access point installed in the system acts as a higher-level interface between the server or its software application and the NFC sub-system registered at the respective access point. At the shelf edge strip level, the NFC reader assumes this interface function, said NFC reader acting as a lower-level interface between the shelf labels installed on its shelf edge strip and the access point to which the respective NFC reader, and thus also the respective NFC sub-system to which the NFC reader belongs, is logically (wirelessly) assigned.

In a business premises, for example of a supermarket, a plurality of access points can be installed, each access point being provided for communication with the NFC readers logically assigned to it, which are located within a geographical region (within wireless range) around the access point.

If a plurality of shelf labels are arranged corresponding to a conductor loop of the shelf edge strip or a plurality of shelf labels are supplied with energy via a single conductor loop at the same time, precautions must be taken to ensure that the respective shelf label identifier or shelf label NFC identifier is received. To this end, the shelf labels can for example be programmed such that they output their identifier (once or multiple times) at randomly selected times within a time window in order to ensure individual receipt at the NFC reader of the shelf edge strip. An anti-collision method known for example from RFID technology can likewise be used during this contactless transfer in order to ensure individual receipt at the NFC reader of the shelf edge strip. In the technical jargon, the detection of the NFC-enabled shelf labels fastened to the shelf edge strip is referred to as running through a polling loop, wherein the NFC reader checks which shelf labels are present and detects their shelf label NFC identifier.

The shelf label identifier requested from the shelf label by the NFC reader is forwarded by the NFC reader, in a communication with the access point, to the server of the business premises, which server carries out and coordinates communication with the individual electronic shelf labels in order then to request data from them or transmit data to them.

The server also stores the logical link between products placed on the respective shelving unit and the shelf label (displays) positioned there and thus ensures that the respective shelf label display presents the information belonging to the product positioned corresponding to the shelf label.

The server can also be informed of the position or extent of the respective conductor loop on the shelf edge strip and can also be informed, by the respective NFC reader together with the shelf label identifier, of which conductor loop was used to acquire the shelf label identifier from the shelf label. Three-dimensional digital maps of the positions of all the shelf labels in a business premises can thus also be created. This relates both to the shelf labels (shelf label displays) configured to display information and analogously to the shelf labels which provide the other possible functionalities mentioned.

The electronics of the different devices or components and/or modules of the system and the interface thereof etc. can be realized with the aid of a wide variety of passive and active electronic components or functional units in a discrete or integrated manner. Preferably, a microprocessor with corresponding peripheral components or a microcontroller, upon which a software for providing the various functionalities is executed, is used in this case. Also, what are known as ASICs (Application-Specific Integrated Circuits) can be used.

These and further aspects of the invention result from the figures discussed below.

BRIEF DESCRIPTION OF THE FIGURES

The invention is explained once more in detail in the following with reference to the attached figures on the basis of exemplary embodiments, to which the invention is not restricted, however. In the various figures, identical components are provided with identical reference numbers. In the figures.

DESCRIPTION OF THE EXEMPLARY EMBODIMENTS

Figure 1:
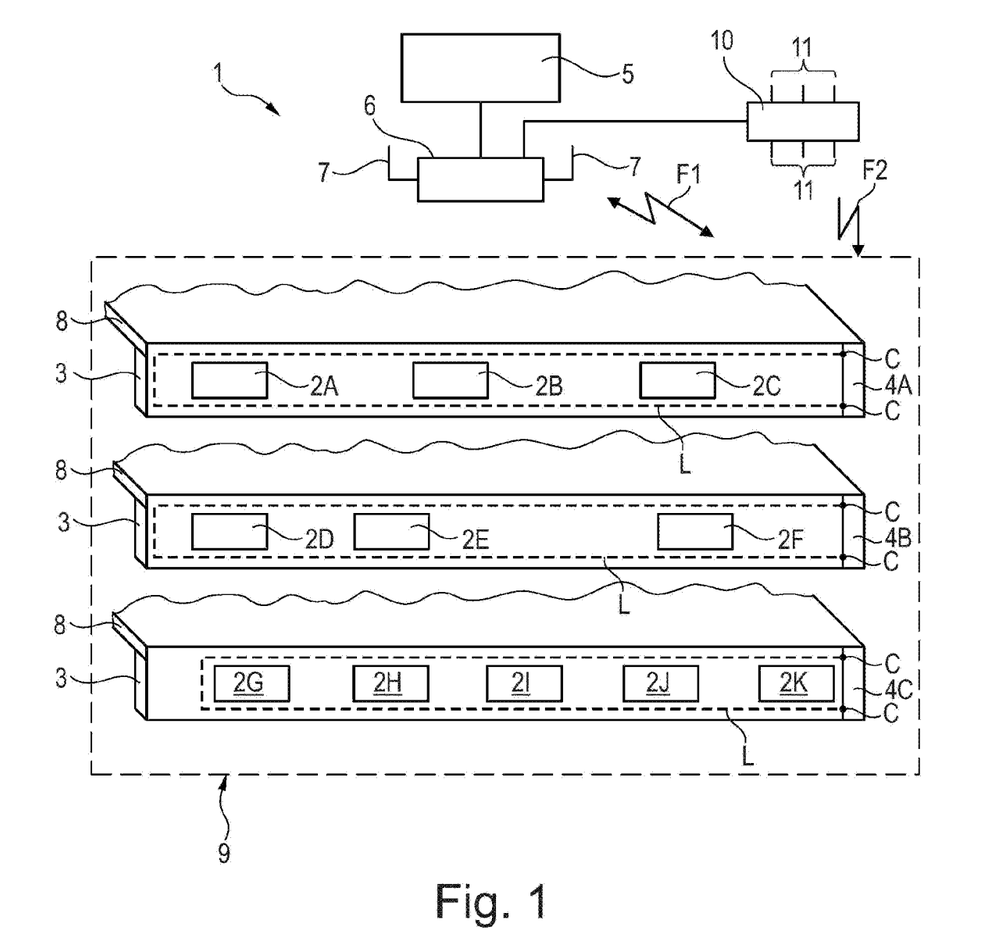
FIG. 1 schematically shows a detail of an electronic shelf label system according to the invention having an "intelligent" shelf edge strip.

FIG. 1 illustrates a shelf label system 1, which comprises a number of identical electronic NFC-enabled shelf labels 2A-2K realized as shelf label displays and fastened to three "intelligent" shelf edge strips 3. Each of the shelf edge strips 3 has an NFC sub-system. An NFC reader 4A-4C is a constituent of each NFC sub-system. The NFC reader 4A-4C is inserted laterally into the shelf edge strip 3. Each shelf edge strip 3 furthermore has, as a constituent of the NFC sub-system, a conductor loop L, which extends along the entire length of the shelf edge strip 3, and the conductor loop connectors C of which are electrically conductively connected to the NFC reader 4A-4C. The conductor loop L forms the antenna of the respective NFC reader 4A-4C and is thus a constituent, integrated in the shelf edge strip 3, of the respective NFC reader 4A-4C. As soon as shelf labels 2A-2K are installed on the respective shelf edge strip 3 corresponding to the conductor loop L thereof and have been detected by the NFC reader 4A-4C there, these shelf labels 2A-2K also form a constituent of the respective NFC sub-system of the shelf edge strip 3.

The respective NFC reader 4A-4C assumes the role of a shelf edge strip controller for controlling the shelf labels 2A-2K installed on its shelf edge strip 3. In this case, the respective NFC reader 4A-4C communicates with the NFC-enabled shelf labels 2A-2K installed on its shelf edge strip 3 according to an NFC communication protocol. To this end, it sends an NFC wireless signal with the aid of the conductor loop L, said NFC wireless signal being used at the respective shelf label 2A-2K both for energy supply and for data transmission.

Also illustrated is a data processing device, which in the present case is realized with the aid of a server 5, which is connected in a wired manner to an access point 6, which has two antennas 7, for example.

The NFC readers 4A-4C are furthermore modified such that they are in wireless contact with the access point 6 via first wireless signals F1 according to a proprietary time slot communication method. Thus, for example, image contents of the shelf labels 2A-2K can be changed from the server 5, where necessary also associated status information can be requested from the shelf labels 2A-2K and transmitted to the server 5.

Each of the shelf edge strips 3 is mounted on the front edge of an individual shelf 8. The three shelves 8 illustrated all belong to a shelving unit 9 indicated only very schematically. Different products can be placed on the shelves 8 but in the present case are not illustrated for reasons of simplicity.

Furthermore, the NFC readers 4A-4C are designed such that they can for their part be supplied with energy with the aid of a second wireless signal F2. To this end, the system 1 has a supply transmitter 10 (also referred to as a wireless energy source), which is designed to transmit electrical energy at a certain transmitting power, such as 5 W for example, to a receiver (that is to say, to one of the NFC readers 4A-4C) with the aid of the focused or directed (second) wireless signal F2. Such a supply transmitter 10 also has a plurality of antennas 11 (in this case, six units are illustrated), with the aid of which the direction of the energy transmission (ultimately the propagation of the second wireless signal F2) can be set relatively precisely so that the second wireless signal F2 transmitting the energy arrives precisely at the respective NFC reader 4A-4C. This energy transmission is known under the term "power over WiFi".

It should also be mentioned at this point that, for reasons of simplicity, only one access point 6 and one single shelving unit 9 have been visualized, but a plurality of such system components are present in a real environment of a supermarket. In that case, a single access point 6 would wirelessly supply a multiplicity of shelving units 9 within its environment.

Figure 2:
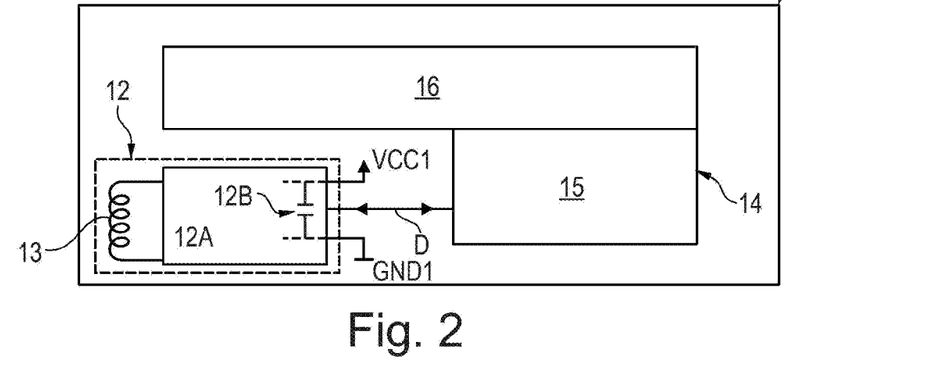
FIG. 2 schematically shows an exemplary embodiment of a shelf label as a block diagram.

A block diagram of the shelf labels 2A-2K is explained in the following using FIG. 2, wherein the reference sign 2 has been used for the identical shelf labels 2A-2K for the sake of simplicity.

The block diagram shows a first NFC interface 12 with its coupling coil or antenna 13. With the aid of the coupling coil 13, the NFC wireless signal can be received by another NFC-enabled device, in the present case the NFC reader 4A-4C. To this end, the coupling coil 13 must be positioned correspondingly close (a few tenths of a millimetre to approximately 4 millimetres) to the conductor loop L, which is the case with the shelf labels 2 fastened to one of the shelf edge strips 3. While the NFC wireless signal exists, a first supply voltage VCC1 (relative to a local first reference potential GND1) for operating the entire shelf label 2 is generated with the aid of the NFC interface 12.

Specifically, the first NFC interface 12 has electronics 12A which are designed for generating the first supply voltage VCC1 and for providing the NFC communication capability. Furthermore, the electronics 12A have a long-term energy storage device, realized in the present case as a supercap 12B, with the aid of which the first supply voltage VCC1 can be maintained even in the absence of the NFC wireless signal, over longer periods than would be the case with the aid of a smoothing capacitor or backup capacitors (neither of which is illustrated). The shelf label 2 can thus be operational and execute tasks, such as detecting temperature or user inputs according to the design, even in the absence of the NFC wireless signal. The supercap 12B is charged with the aid of the electronics 12A when the NFC wireless signal is present.

As soon as the electronics 12A have been activated with the aid of the NFC wireless signal, the first NFC interface 12 is also available for contactless bidirectional communication of data D. A constituent of these electronics 12A is an NFC tag controller, which provides the entire NFC functionality, is not illustrated here in detail however, but is integrated in the first NFC interface 12.

The block diagram also shows a display unit 14, which is connected to the first NFC interface 12 and is divided into an electronic paper display controller 15, EPD controller 15 for short, and an electronic paper display screen 16 which can be controlled therewith. With the aid of the EPD controller 15, the data received via the first NFC interface 12 are interpreted, the image contents of the screen 16 are changed accordingly, where necessary, or else status information in the form of data D is output to the NFC reader 4A-4C via the first NFC interface 12.

A block diagram of the shelf edge strip 3 is explained below using FIG. 3. Analogously to the description of the shelf labels 2A-2K, the reference numeral 4 has been used for the identical NFC readers 4A-4C in this case too.

Figure 3:
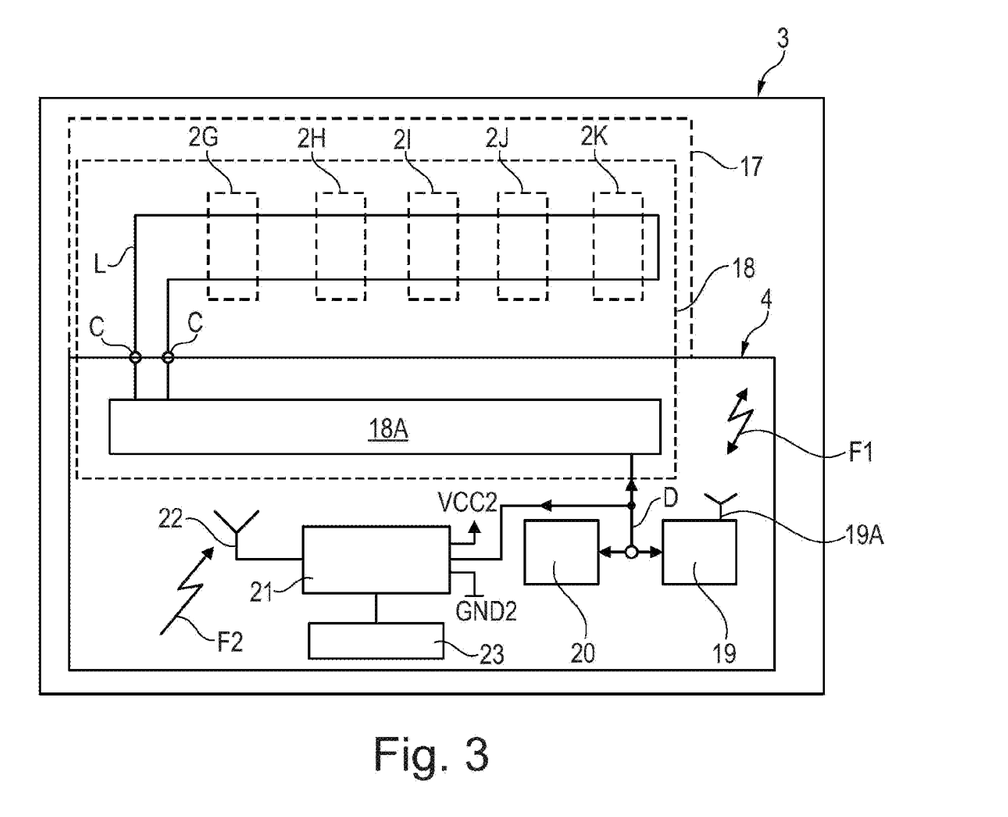
FIG. 3 schematically shows an exemplary embodiment of the shelf edge strip as a block diagram with an NFC sub-system.

In FIG. 3, it is indicated that the shelf edge strip 3 supports the shelf labels 2G-2K and is therefore the shelf edge strip 3 illustrated at the bottom of FIG. 1. The shelf labels 2G-2K are positioned corresponding to the position of the conductor loop L.

In contrast to FIG. 1, the electrical connection of the loop connectors C to second electronics 18A of the NFC reader 4 can be seen. The conductor loop L forms, together with the second electronics 18A, a second NFC interface 18 of the NFC reader 4. In this case too, the second electronics 18A have their own NFC reader controller (not illustrated), which provides the entire NFC reader functionality. With the aid of the second NFC interface 18, the NFC wireless signal can be generated and output, and thus electrical energy can be transmitted contactlessly to the shelf labels 2G-2K, and bidirectional communication of data with them can be carried out.

It should be emphasized at this point that although the conductor loop L is a constituent of the NFC reader 4, it is accommodated outside the NFC reader 4 in the mechanical structure of the shelf edge strip 3. This is symbolized by a structure 17 of the shelf edge strip 3, which encloses the conductor loop L and adjoins the NFC reader 4.

The NFC reader 4 furthermore has an access point communication module 19, which is designed for wireless communication with the access point 6 illustrated in FIG. 1. To this end, the access point communication module 19 has electronics (not illustrated in detail) designed therefor and an antenna configuration 19A, which can also comprise multiple antennas. To control the internal processes and communication with the access point 6 according to the aforementioned proprietary time slot communication method, the supply device 4 has a control unit 20. The control unit 20 is realized with the aid of a microcontroller, which is connected to the second NFC interface 18 and the access point communication interface 19 via a bidirectional data bus.

To realize the "power over WiFi" energy transmission, the NFC reader 4 has a supply receiver 21 which is suitable for receiving the second wireless signal F2 and is equipped with its antenna configuration 22 (which can have multiple antennas) and electronics (not illustrated in detail), which are designed to receive the second wireless signal F2 and to store the energy transmitted therewith in an internal electrical energy storage device 23 (chargeable battery, rechargeable battery or supercap etc.) and thus to generate a second supply voltage VCC2 in relation to a second reference potential GND2 for the electrical supply of the NFC reader 4.

The control unit 20 is also connected by its data bus to the supply receiver 21.

During operation, the NFC reader 4 can query or monitor the state of charge of the energy storage device 23, for example with the aid of the control unit 20 of the NFC reader. As soon as the state of charge falls below a certain level, the control unit 20 can request a (re)charge with the aid of the first wireless signal F1. This request is received by the access point 6 and can be forwarded directly to the supply transmitter 10 or forwarded to the supply transmitter 10 by involving the server 5, depending on the implementation. Since the exact geographical position (the three-dimensional coordinates) of each of the NFC readers 4 within the business premises and their unique reader identifier is known in the system 1 (e.g. the server 5), the supply transmitter 10 can send the second wireless signal F2 in a precisely directed manner towards the position of the respective NFC reader 4 requesting charging. The second wireless signal F2 is received there, and the energy thus transmitted is used to charge the internal energy storage device 23.

The shelf edge strip 3 described here is therefore designed, with the aid of its NFC sub-system, for contactless communication with the shelf labels 2 installed on it and with an access point 6 assigned wirelessly to it and for contactless provision of energy within the meaning of energy storage for the NFC reader's 4 own operation and for the contactless energy supply of the respective shelf labels 2.

It should also be mentioned at this point that the supply transmitter 10 can also be installed in the access point 6.

Figure 4:
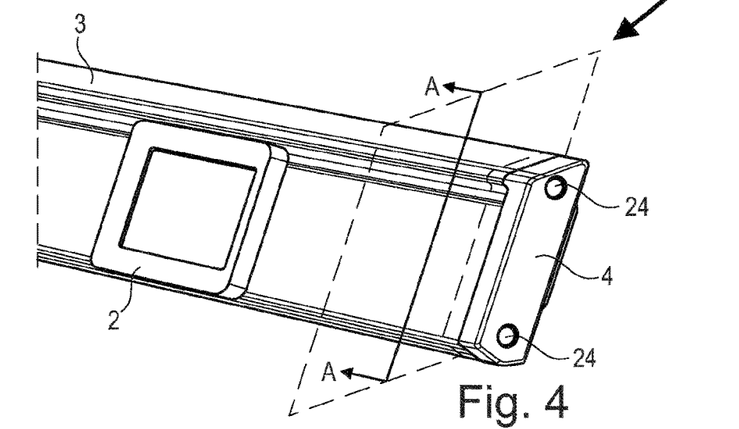
FIG. 4 schematically shows a shelf edge strip with a shelf label in a perspective view.

The structure of the "intelligent" shelf edge strip 3 is discussed below using FIGS. 4-6. FIG. 4 thus shows a shelf edge strip 3 with a shelf label 2 fastened to it and with the NFC reader 4 inserted laterally into the shelf edge strip 3 and fastened in the structure of the shelf edge strip 3 with screws 24. This shelf edge strip 3 has a length of approximately 3 m, a height of approximately 4.5 cm and a thickness of 1.2 cm, for example.

Figure 5:
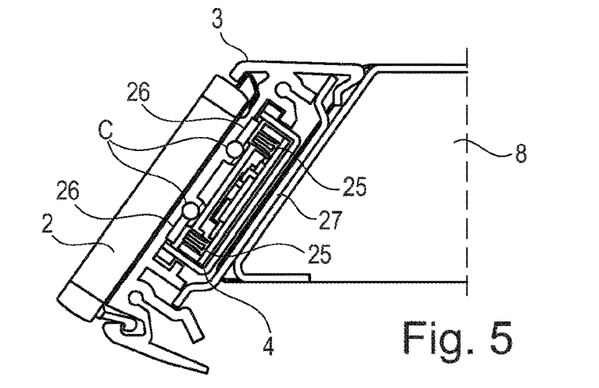
FIG. 5 schematically shows a sectional diagram of the shelf edge strip.

FIG. 5 shows a section through the shelf edge strip 3 according to a sectional plane A-A drawn in FIG. 4, which is oriented transversely (normal to the front of the shelf edge strip 3) through the shelf edge strip 3 and runs at the point at which contact elements 25 of the NFC reader 4 are formed, which are used to contact the conductor loop L of the NFC reader 4 running in the shelf edge strip 3. In this view, the contact elements 25 make contact with contact tabs 26, which are for their part in contact with the conductor loop connectors C. The contact tabs 26 can however be omitted if a different geometry is selected, and therefore the conductor loop connectors C can also be contacted directly with the contact elements 25. A shielding plate 27 can furthermore be seen on the rear side of the shelf edge strip 3 and likewise extends along the entire shelf edge strip 3 analogously to the conductor loop L.

Figure 6:
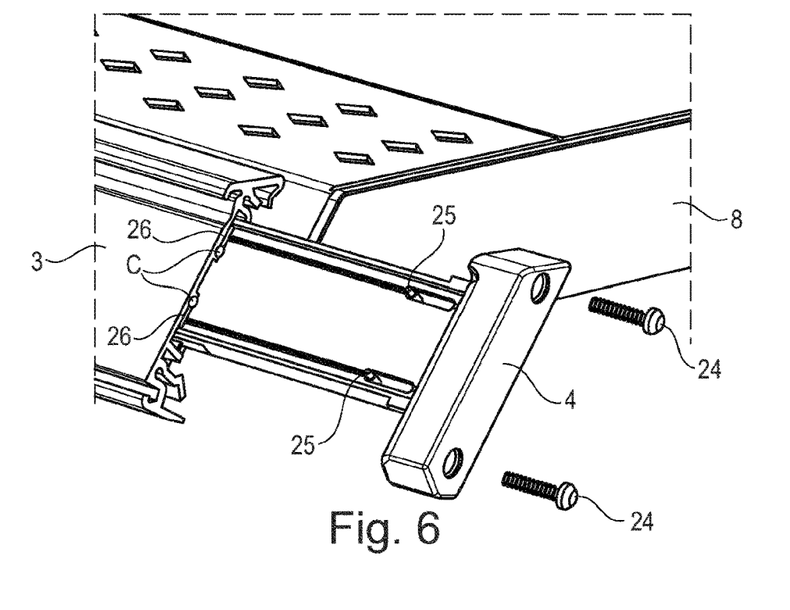
FIG. 6 schematically shows an exploded view of the shelf edge strip.

FIG. 6 shows the NFC reader 4 fastened to a rail or sliding mechanism, the sliding mechanism being partially drawn out of a shaft, designed for receiving it, in the shelf edge strip 3.

Figure 7:
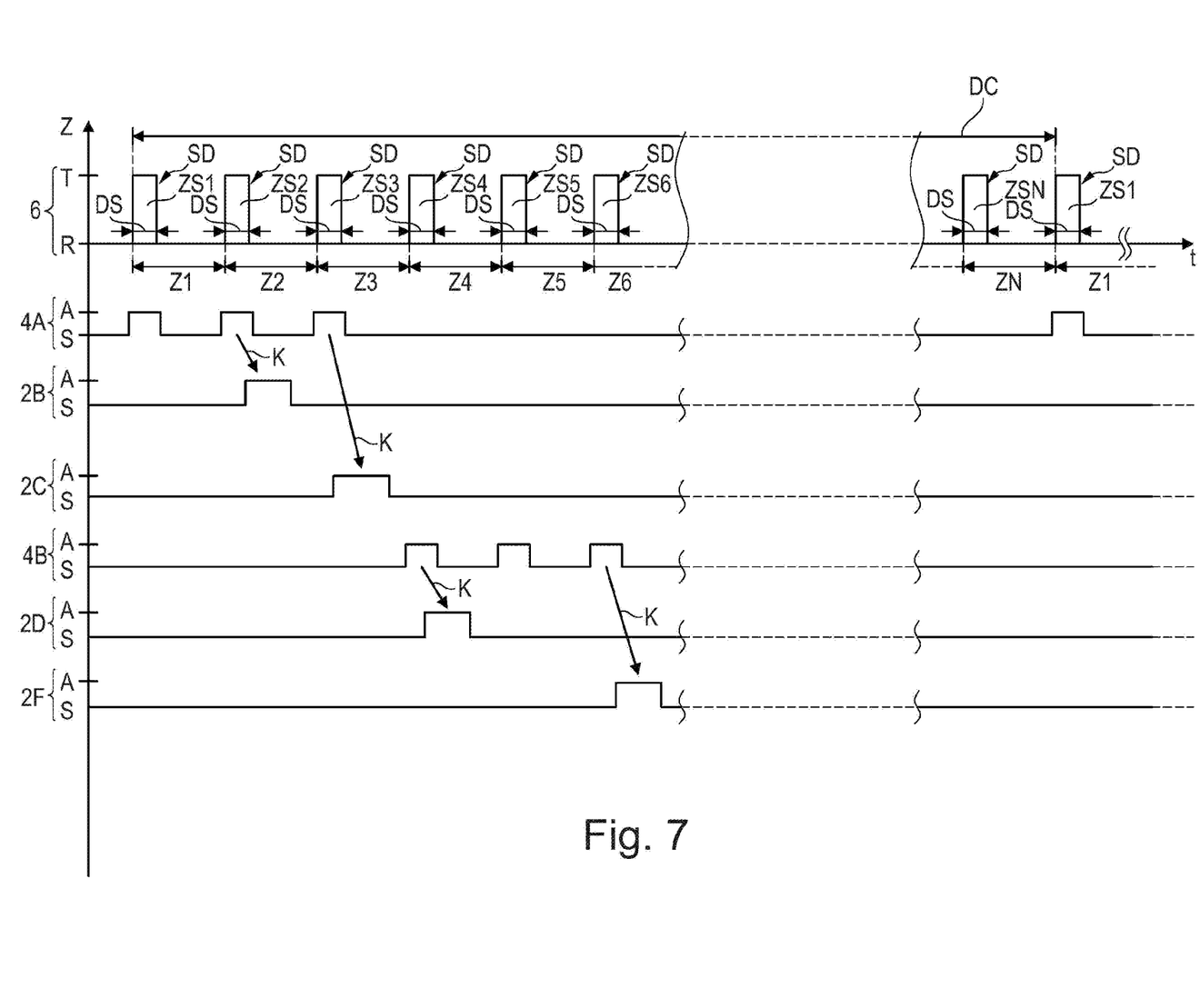
FIG. 7 schematically shows a state diagram of system component activities according to a first exemplary embodiment.
Figure 8:
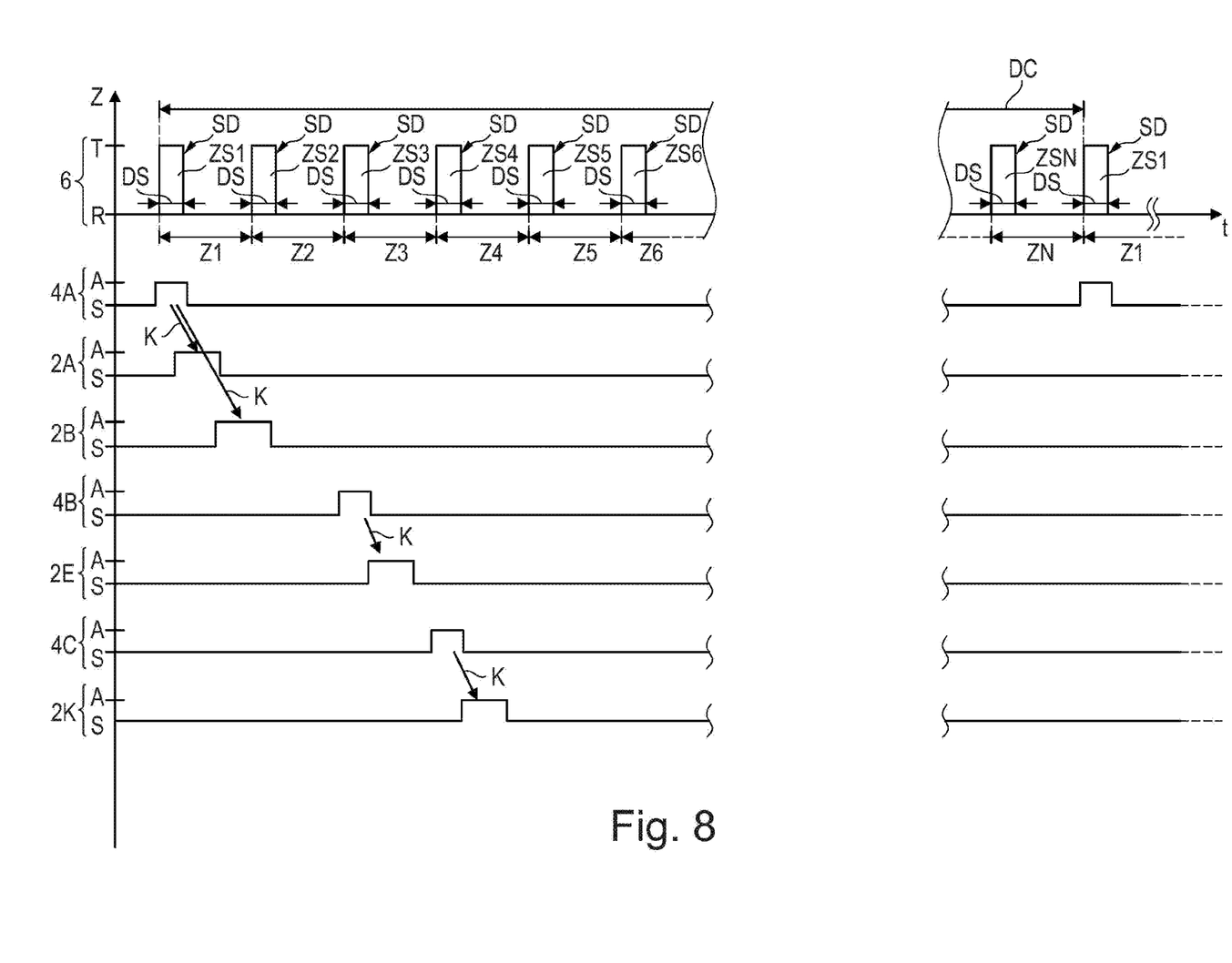
FIG. 8 schematically shows a state diagram of system component activities according to a second exemplary embodiment.

The addressing of the shelf labels 2 is discussed in the following with reference to FIGS. 7-8. FIGS. 7-8 each show a state diagram with the time t being plotted on the abscissa and states Z of the system components being plotted on the ordinate.

FIG. 7 shows a chronological system in the time slot communication method, in which N (e.g. 256) time slots Z1 . . . ZN with an identical time slot duration DS (e.g. approximately 58 milliseconds) are available in a continuously repeating manner within a time slot cycle duration DC (e.g. 15 seconds). During the time slot cycle duration DC, the access point 6 changes between a transmitting state T and an idle state R. The transmitting state T is always assumed at the start of a time slot Z1 . . . ZN and is maintained for a synchronization data signal duration DSD (or transmission time duration DSD) of the synchronization data signal SD in order to transmit the respective applicable time slot symbol ZS1, ZS2, . . . ZSN with the respective synchronization data signal SD. The serial number of the respective time slot Z1 . . . ZN in the order of occurrence of the time slot Z1 . . . ZN is used as the respective time slot cycle symbol ZS1 . . . ZSN.

In order to address one of the shelf labels 2A-2K individually and where necessary also supply it with data, address data AD and where necessary also command data CD are embedded in the synchronization data signal SD of the relevant time slot Z1-ZN by the access point 6.

In the present exemplary embodiment, it is assumed that all the NFC readers 4A-4C are registered wirelessly at the access point 6 and can therefore communicate with it according to the time slot communication method. Each NFC reader 4A-4C has initially detected the shelf labels 2A-2C, 2D-2F and 2G-2K attached to its shelf edge strip 3 with the aid of an NFC polling loop and stored their individual shelf label NFC identifier in order to carry out NFC communication with them. In addition, each NFC reader 4A-4C stores which of the shelf labels 2A-2C, 2D-2F and 2G-2K attached to its shelf edge strip 3 is assigned to which of the time slots Z1-ZN. This data structure, stored in the NFC reader 4A-4C, for assigning the shelf labels 2A-2K also uses the server 5 to address the shelf labels 2A-2K individually, in which case multiple shelf labels 2A-2K can also be assigned to one time slot Z1-ZN.

It is thus assumed in the present case that, for example, the shelf labels 2A-2C are assigned chronologically to the first three time slots Z1-Z3. The entries in the data structure of the NFC reader 4A then prompt it to change from its sleep state S to its active state A promptly upon the occurrence of the synchronization data signal SD of the first, second and third time slots Z1, Z2 and Z3. It can be advantageous here if the duration of the active state is slightly longer than the synchronization data signal duration DSD. In the active state, the relevant synchronization data signal SD is received, the NFC reader 4A establishes its synchronism on the basis of the time slot symbol ZS1, ZS2 and ZS3 contained in the respective synchronization data structure SD and checks whether the shelf label 2A, 2B or 2C assigned to the respective time slot Z1, Z2 or Z3 is addressed individually by the server 5 with the aid of the address data AD.

In the present case, it is assumed that the shelf labels 2B and 2C are addressed, which leads to NFC communication, delayed in the present case, between the NFC reader 4A and the two shelf labels 2B and 2C, which is visualized by the arrows K. First, the NFC wireless signal is generated, and the first supply voltage VCC 1 is generated. This results in the respective shelf label 2B or 2C leaving its sleep state S and changing to its active state A. Then the respective command data CD is transferred to the addressed shelf label 2B and 2C and processed there.

The second NFC reader 4B behaves analogously, the shelf labels 2D, 2E and 2F of which are assigned to the fourth to sixth time slots Z4, Z5 and Z6, wherein in the present case, it is assumed that only the fourth and the sixth shelf labels 2D and 2F are addressed. The same applies analogously for the third NFC reader 4C, wherein in this case, it is assumed that none of its shelf labels 2G-2K is addressed.

The shelf labels 2A, 2E and 2G-2K which are not addressed therefore all remain in their energy-saving sleep state S within the time slot cycle visualized. The NFC readers 4A-4C also remain in their sleep state S in time slots Z1-ZN for which no shelf labels assigned to the respective time slot Z1-ZN are recorded in the data structure.

It is furthermore mentioned that the NFC readers 4A-4C can also be in the active state A continuously or multiple times within the respective time slot Z1-ZN, if, for example an acknowledgement from the respective shelf label 2A-2K must take place within the relevant time slot or also additional data are to be transmitted with the affected shelf label 2A-2K within this time slot. Data transmissions between the access point 6 and the respective NFC reader 4A-4C can also extend over multiple time slots Z1-ZN, which can lead to the active state A being present multiple times at the affected NFC reader 4A-4C within the time slot cycle.

Data transmission within the NFC sub-system can also take place in real time in the respective time slot when addressing of a shelf label 2A-2K is detected, that is to say, not with a time delay with respect to the respective time slot as shown in FIG. 7.

In contrast to the exemplary embodiment explained above, it is now assumed according to a further (second) exemplary embodiment and visualized with the aid of FIG. 8 that each of the NFC readers 4A-4C is assigned to a certain time slot Z1-ZN, for example, the first NFC reader 4A is assigned to the first time slot Z1, the second NFC reader 4B is assigned to the third time slot Z3, and the third NFC reader 4C is assigned to the fourth time slot Z4. The assignment of the shelf labels 2A-2K to the respective time slots Z1-ZN necessarily results only by means of this assignment of the NFC readers 4A-4C to the time slots. In this case, therefore, the shelf labels 2A-2C are assigned to the first time slot Z1, the shelf labels 2D-2F are assigned to the third time slot Z3, and the shelf labels 2G-2K are assigned to the fourth time slot Z4. To be able to address a shelf label 2A-2K within this system 1, the server 5 must know which NFC reader 4A-4C can wirelessly operate which shelf label 2A-2K in an NFC communication in order then to address the shelf label 2A-2C, 2D-2F or 2G-2K available there indirectly via the addressing of the respective NFC reader 4A-4C in the time slot communication method. This assignment is stored in a database of the server 5. The data structure of the NFC reader 4A-4C stores the time slot symbol ZS1-ZSN of the time slot Z1-ZN to which the relevant NFC reader 4A-4C is assigned and the addresses (shelf label identifiers) of the shelf labels 2A-2C, 2D-2F or 2G-2K that can be addressed via it. In this case too, the shelf label NFC identifiers for NFC communication are stored in the NFC sub-system.

The entries in the data structure of the first NFC reader 4A then cause it to change from its sleep state S to its active state A promptly upon occurrence of the synchronization data signal SD of the first time slot Z1, to establish its synchronism and to check whether it is addressed by the server 5 for the purpose of indirect addressing of shelf labels. If this is the case, it is further checked whether the server also addresses one of the shelf labels 2A-2C and, if this addressing is present, data traffic is handled where necessary in an NFC communication of the NFC reader 2A with this addressed shelf label. In the present case, it is assumed that only the shelf labels 2A and 2B were addressed within the time slot cycle visualized, which leads to a sequential NFC communication in the NFC sub-system with the shelf labels 2A and 2B, which is visualized by means of the arrows K.

The same applies, mutatis mutandis, to the second NFC reader 4B, which changes from its sleep state S to its active state A within the period of the occurrence of the synchronization data signal SD of the third time slot Z1, establishes its synchronism and carries out its check as to whether it is addressed by the server 5 for the purpose of indirect addressing of shelf labels. It is assumed here that only the fifth shelf label 2E is addressed, which leads to an NFC communication with this in the NFC sub-system.

The situation is similar with the third NFC reader 4C, the entries of which in its data structure cause it to change from its sleep state S to its active state A promptly upon occurrence of the synchronization data signal SD of the fourth time slot Z4, to establish its synchronism and to check whether it is addressed by the server 5 for the purpose of indirect addressing of shelf labels, in order to address one of its shelf labels 2G-2K when such an addressing sequence is present. It is assumed here that only the eleventh shelf label 2K was addressed, which leads to an NFC communication with this in the NFC sub-system.

As can be seen if the state diagrams of FIGS. 7 and 8 are compared, the NFC readers 4A-4C have to be active less often in each time slot cycle in the implementation according to the second exemplary embodiment, which means that, in the comparison of the two exemplary embodiments, the second exemplary embodiment prevails over the first exemplary embodiment in terms of energy efficiency.

Finally, it is once more pointed out that the figures previously described in detail are only concerned with exemplary embodiments, which can be modified in many different ways by the person skilled in the art, without departing from the scope of the invention. For the sake of completeness, it is also pointed out that the use of the indefinite article "a" or "an" does not mean that the relevant features cannot also be present multiple times.

The invention claimed is:

1. An electronic shelf label system (1),
the system (1) comprises a server (5) which is designed to address a multiplicity of shelf labels (2A-2K) individually in order to communicate data with them in an addressed manner, and
the system (1) comprises at least one access point (6) which is connected to the server (5) and is designed for wireless communication of the data with, the shelf labels (2A-2K), and
the system comprises a near-field communication, NFC for short, sub-system on a shelf edge strip (3) of a shelving unit (9), wherein the NFC sub-system is characterized such that
the shelf edge strip (3) comprises an NFC reader (4A-4C) which is designed for wireless communication with the access point (6), and that
at least one conductor loop (L) is provided which is connected to the NFC reader (4, 4A-4C), is formed along the shelf edge strip (3) and is used for NFC communication with an NFC-enabled shelf label (2A-2K), wherein
at least one NFC-enabled shelf label (2A-2K) is attached to the shelf edge strip (3) corresponding to the conductor loop (L), and wherein
the NFC reader (4, 4A-4C) is designed for NFC communication of the data with the shelf label (2A-2K) addressed by the server (5).

2. The electronic shelf label system (1) according to claim 1, wherein
the access point (6) and the NFC reader (4A-4C) are designed for wireless communication according to a time slot communication method, wherein, in the time slot communication method, a number of time slots (Z1-ZN) in a repeating sequence per time slot cycle are available for communication, each time slot (Z1-ZN) preferably being identified by a unique time slot symbol (ZS1-ZSN).

3. The electronic shelf label system (1) according to claim 2, wherein
the NFC reader (4, 4A-4C) stores a data structure representing an assignment of a shelf label (2A-2K) fastened to its shelf edge strip (3) to one of the time slots (Z1-ZN), and
wherein the NFC reader (4, 4A-4C) is designed to check the time slot (Z1-ZN) to which a shelf label (2A-2K) is assigned according to the data structure as to whether the shelf label (2A-2K) fastened to its shelf edge strip (3) is addressed by the server (5).

4. The electronic shelf label system (1) according to claim 3, wherein
the NFC reader (4A-4C) is designed to transfer data between the addressed shelf label (2A-2K) and the access point (6), when there is a positive check result, in the time slot (Z1-ZN) defined for the addressed shelf label (2A-2K) according to the data structure.

5. The electronic shelf label system (1) according to claim 3, wherein
the NFC reader (4, 4A-4C) comprises an energy-saving sleep state, in which the NFC reader (4, 4A-4C) is not ready to communicate with the access point (6), and an active state, in which the NFC reader (4, 4A-4C) is ready to communicate with the access point (6), and wherein
the NFC reader (4, 4A-4C) is designed to change from the sleep state to the active state promptly upon the occurrence of the time slot (Z1-ZN) to which a shelf label (2A-2K) is assigned according to the data structure.

6. The electronic shelf label system (1) according claim 3, wherein the server (5) stores an individual shelf label identifier of each shelf label (2A-2K) in a database and addresses the respective shelf label (2A-2K) directly using the shelf label identifier.

7. The electronic shelf label system (1) according to claim 2, wherein
the NFC reader (4A-4C) is assigned to one of the time slots (Z1-ZN) and stores a data structure representing the shelf labels (2A-2K) fastened to the shelf edge strip (3) of the NFC reader (4A-4C), and wherein
the NFC reader (4A-4C) is designed to check the time slot (Z1-ZN) to which it is itself assigned as to whether the shelf label (2A-2K) fastened to its shelf edge strip (3) is addressed by the server (5).

8. The electronic shelf label system (1) according to claim 7, wherein
the NFC reader (4, 4A-4C) is designed, when there is a positive check result, to transfer data between the addressed shelf label (2A-2K) and the access point (6) in the time slot (Z1-ZN) defined for the NFC reader (4, 4A-4C).

9. The electronic shelf label system (1) according to claim 7, wherein
the NFC reader (4A-4C) comprises an energy-saving sleep state, in which the NFC reader (4, 4A-4C) is not ready to communicate with the access point (6), and an active state, in which the NFC reader (4, 4A-4C) is ready to communicate with the access point (6), and wherein
the NFC reader (4A-4C) is designed to change from the sleep state to the active state promptly upon the occurrence of the time slot (Z1-ZN) to which the NFC reader (4, 4A-4C) is assigned.

10. The electronic shelf label system (1) according to claim 7, wherein the server (5) stores, in a database, a link between a reader identifier of an NFC reader (4A-4C) and a shelf label identifier of the shelf label (2A-2K) which is installed on the shelf edge strip (3) of the NFC reader (4A-4C), and addresses a shelf label (2A-2K) indirectly via the link between the shelf label identifier of the shelf label (2A-2K) to be addressed and the reader identifier.

11. The electronic shelf label system (1) according to claim 1, wherein the shelf label (2A-2K) comprises an energy-saving display unit (16), in particular based on electronic ink or electronic paper technology etc.

12. The electronic shelf label system (I) according to claim 1, wherein the shelf label (2A-2K) comprises a chargeable, electrical energy storage device (12B) and is designed to charge the energy storage device (12B) contactlessly with the aid of an NFC wireless signal of the NFC reader (4A-4C).

13. A method for operating an electronic shelf label system (1), wherein
a multiplicity of shelf labels (2A-2K) are addressed individually in the system (1) with the aid of a server (5), and data are communicated with them in an addressed manner, wherein
the data are communicated wirelessly with the shelf labels (2A-2K) in the system (1) via at least one access point (6) which is connected to the server (5), wherein the system (1) comprises a near-field communication, NFC for short, sub-system on a shelf edge strip (3) of a shelving unit (9), wherein the NFC sub-system is characterized such that the shelf edge strip (3) comprises an NFC reader (4A-4C) which is designed for wireless communication with the access point (6), and that at least one conductor loop (L) is provided which is connected to the NFC reader (4A-4C), is formed along the shelf edge strip (3) and is used for NFC communication with an NFC-enabled shelf label (2A-2K), wherein at least one NFC-enabled shelf label (2A-2K) is attached to the shelf edge strip (3) corresponding to the conductor loop (L), and wherein according to the method the data are communicated by means of NFC communication between the NFC reader (4A-4C) and the shelf label (2A-2K) addressed by the server (5).

\* \* \* \* \*